UNITED STATES PATENT OFFICE

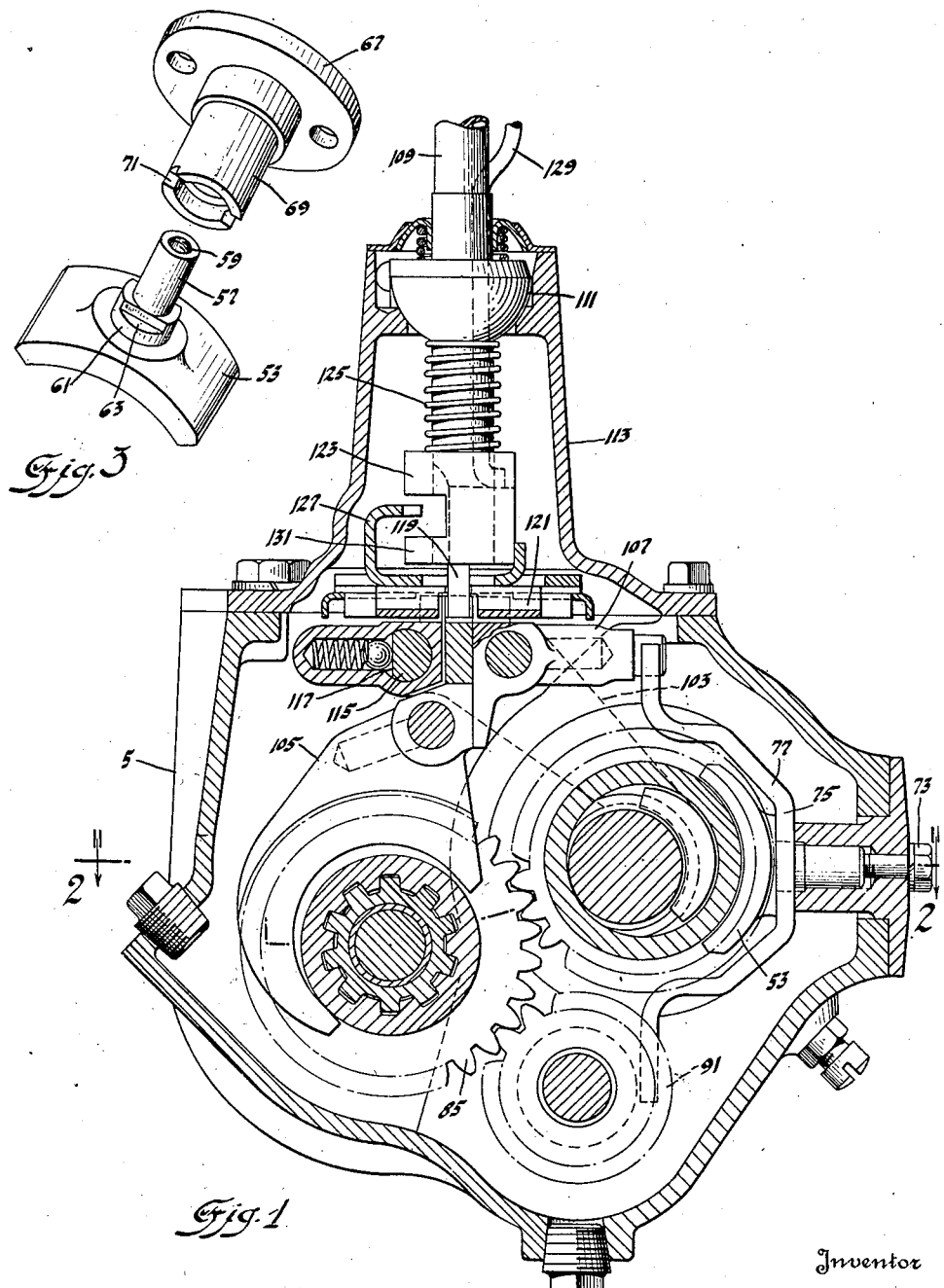

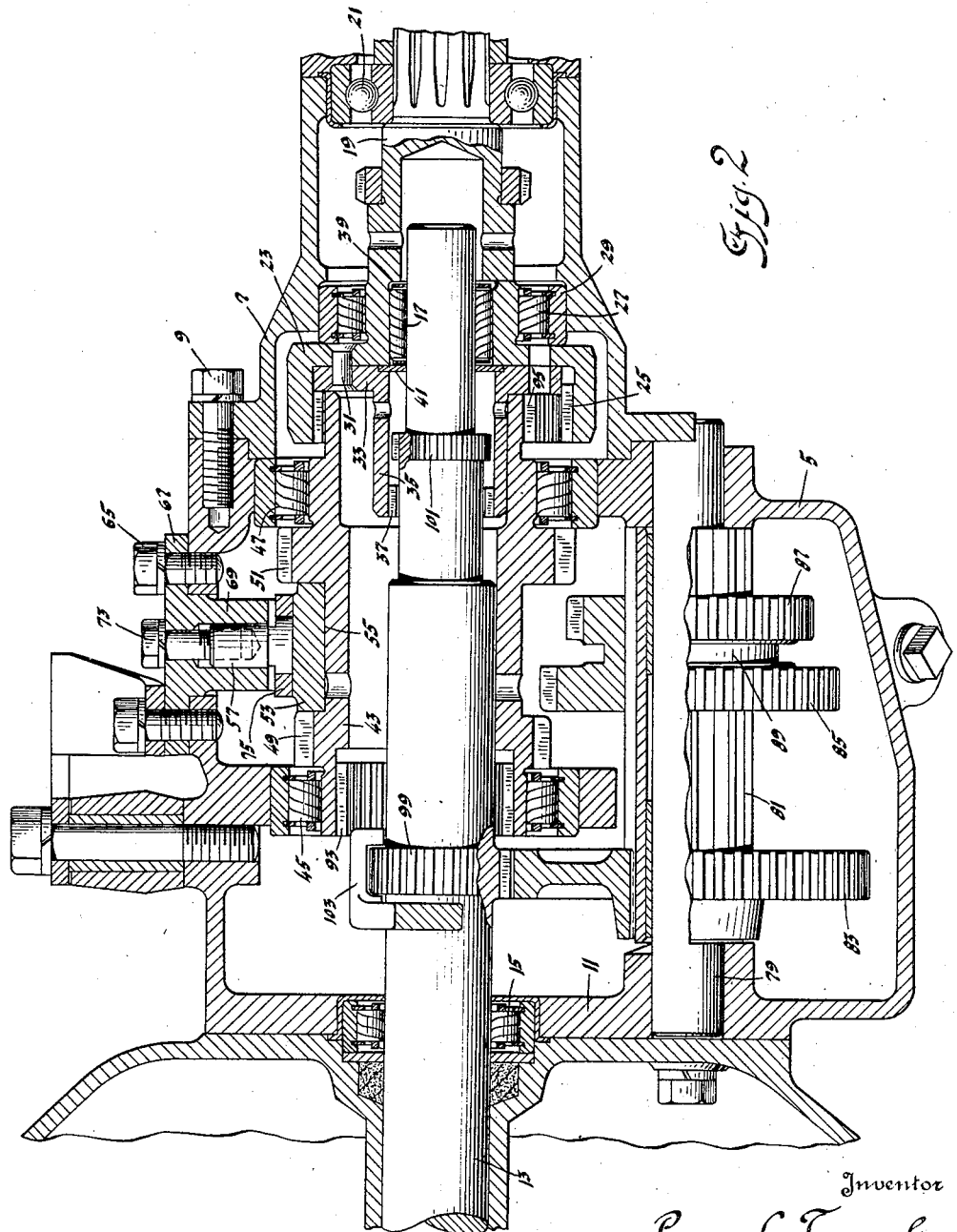

PERRY L. TENNEY AND HARRY E. FIDLER, OF MUNCIE, INDIANA, ASSIGNORS TO GENERAL MOTORS CORPORATION, OF DETROIT, MICHIGAN, A CORPORATION OF DELAWARE

OVERSPEED TRANSMISSION

Application filed July 1, 1927. Serial No. 202,859.

This invention relates to power transmission and has been designed as a change speed mechanism for motor vehicles.

The invention has for its object the provision of four forward speeds and a single reverse driving ratio.

More specifically it is an object of the invention to provide a longitudinally slidable primary driving shaft to secure the selection of gear ratios. By this means one driving pinion is used to drive the first and second speed countershaft and also for driving the third speed internal gear ring. Another object is to secure fourth speed by a direct clutch engagement between the reciprocating primary shaft and the driven shaft.

As another object and advantage derived from this, my present invention, I am enabled to use conventional gear shifting mechanism and direction of movement. Other objects and advantages will be understood from a reading of the following specification and an examination of the drawing. Among these objects may be mentioned the shaft bearing arrangement and the longitudinal positioning means for the hollow lay shaft.

In the drawing:

Figure 1 is a transverse section of the transmission.

Figure 2 is a longitudinal section on line 2—2 of Figure 1.

Figure 3 is a perspective view of a detail.

Referring to the several figures of the drawing, numeral 5 represents a transmission housing and 7 is a rear cover therefor secured to the housing by fastening means 9. Through the front wall 11 of the housing there enters a primary driving shaft 13, bearings 15 being used as shown in the drawing. In the present cosntruction, however, the primary driving shaft extends to a point within the cover member 7 where it is received within roller bearings 17 carried by the elongated open end of the driven shaft 19. This driven shaft is received within ball bearings 21 at the end of the cover member 7. The driven shaft is formed with a radial flange 23 terminating in an overhanging internal gear 25. Roller bearings 27 are positioned between the shoulder 29 of the cover 7 and the flange 23. Secured by rivets or other suitable fastening means 31 to the flange portion 23 of the driven shaft is a radial flange 33 carried by a tubular sleeve member 35 provided with internal clutch teeth 37. The roller bearing 17 is positioned between the shoulder 39 formed on the recessed portion of the driven shaft 19 and a plate 41 held between the sleeve 35 and the flange 23.

Surrounding the primary driving shaft but eccentrically positioned relative thereto is a gear ring or hollow lay shaft 43. This member 43 is mounted in the transmission housing by bearings 45 and 47 located adjacent its ends. Just within bearing 45 is an external gear 49 and just within bearing 47 is an external gear 51. The longitudinal thrust upon this gear ring or lay shaft 43 is taken by a fixed fork 53. This fork is received within a recess 55 of the hollow shaft 43. The fixed fork 53 is provided with a stem 57 projecting therefrom. The stem is provided with a threaded opening 59. At the base of the stem is a circular portion 61 above which the stem is formed with flats as at 63. Secured to the housing by bolts 65 is a small circular cover 67 having a tubular inward extension 69 into which is received the stem 57. At the inner end of the tubular part 69 are slots 71 which engage the flats 63 when the portion 67 is assembled over the stem 57. This arrangement prevents any relative rotation between these parts. A threaded bolt 73 is extended through the tubular part 69 and into the threaded opening 59 of the stem 57. By this means it is possible to adjust the fixed fork 53 so that it may take the thrust of the hollow shaft 43 and yet be out of frictional contact therewith as shaft 43 rotates. Any tendency of the fixed fork 53 to turn when being adjusted is prevented by the engagement of the notches 71 with the flats 63. The circular portion 61 is to rotatably carry a suitably shaped part 75 of the reverse shifting lever 77.

The fixed shaft 79 rotatably carries a splined countershaft 81. Fixed to the countershaft 81 is a driven gear 83 and slidable on the spline shaft is a double gear comprising external gear members 85 and 87 between which is a yoke 89 for engagement with the shifting fork. An idler gear 91 is to be engaged with gear 85 and may be moved by reverse shifting lever 77 into engagement with gear 51 of the hollow shaft 43 and gear 85.

The hollow shaft 43 is provided with an internal gear 93 at its forward end just within bearing member 45. At the rear end of hollow shaft 43 is an external gear 95 which is in constant mesh with gear 25.

The primary drive shaft 13 has a driving pinion 99 and is also formed with clutch teeth 101. The pinion 99 is surrounded by a fork 103 which renders possible the movement of primary driving shaft 13 from the position shown in Figure 1 to a position in advance thereof and to a position in the rear thereof. In such movement the shaft 13 moves through its bearings 15 and through the bearing 17. It should be noted here that the alignment of bearings 17 and 27 together with the support of shaft 13 by bearings 15 and the support of shaft 19 by bearings 21 and 27 provide a very efficient bearing support for the aligned shafts which insures proper meshing of gears. The shaft 13 in the position shown wherein its pinion 99 is in mesh with gear 83 is in its neutral position. In this position the countershaft is being driven. When moved forward or rearward from this position the countershaft is idle. When moved forward from the position shown clutch teeth 101 on driving shaft 13 engage clutch teeth 37 of the driven shaft member whereupon a direct drive is had through the transmission. Under such circumstances the hollow shaft 43 is rotating freely because of its geared connection with the driven shaft, and as explained the first and second speed countershaft is idle. When the shaft 13 is moved to the rear of the position shown in the figure its pinion 99 is brought into engagement with internal gear member 93 of the hollow shaft 43 and the direct clutch connection is broken. When in this position the driving shaft 13 drives the driven shaft 19 through the internal gear ring at a speed less than that at which it is rotating. This is the third speed. Under these circumstances the countershaft is not driven and the hollow shaft 43 is under load. For driving in first and second speed the driving shaft 13 is returned to its neutral position in which pinion 99 is driving gear 83. Gears 85 and 87 may then be shifted by means of a fork 105 to engage gears 49 or 51 of the hollow shaft 43. In as much as the latter is in constant driving engagement with the driven shaft the driven shaft is thus being driven by the driving shaft through the countershaft. For driving in reverse the fork 107 is shifted to rock the reverse operating lever 77 and thereby shift idler 91 to effect a driving engagement between gear 85 and gear 51.

It will thus be seen that in driving in third and fourth speeds the first and second speed countershaft is idle. The first and second speed countershaft drives through the hollow eccentrically mounted gear 43 and a reverse drive is also through the hollow gear 43. The arrangement of the hollow gear 43 in driving engagement with the driven shaft instead of with the driving shaft reduces the weight of freely spinning elements in the act of gear shifting.

In Figure 1 is shown an operating lever 109 mounted universally at 111 in a cover portion 113 of the transmission housing. The several shifting forks are shown mounted on suitable rods 115 and the forks carry spring actuated detents 117. The lower end of the operating lever 119 is shown in Figure 1 as in engagement with the low speed fork. A suitable interlock 121 is moved laterally with the lever to lock the idle forks from movement. Slidable on the operating lever is a block 123 which is held in its lower position by spring 125. Fixedly mounted with reference to said housing is a plate 127 having projecting ledges so placed as to co-operate with the body of the latch block on the one side and with the body and slot of the latch block on the opposite side. The block in its position shown is in engagement with one ledge of plate 127 whereby the lever 109 is prevented from being shifted into the reverse fork. The movements of the lever when the block is in this position is thus restricted to fourth speed, third speed, second speed and first speed. The block may be raised from the position shown by means of a connecting rod 129 so that its end 131 is brought into engagement with the opposite ledge of the plate 127. When so engaged the lever is prevented from being shifted into engagement with the third and fourth speed fork. The inturned end of this plate 127 may be so shaped as to prevent the lever under these circumstances being moved into second speed. By this arrangement the raising of the block 123 permits rapid and easy shifts between low and reverse only.

We claim:

1. In a change speed transmission, aligned driving and driven shafts, a hollow lay shaft eccentrically surrounding said driving shaft and geared to said driven shaft, said driving shaft being longitudinally movable, clutch elements on each of said aligned shafts to engage in one position of longitudinal adjustment of said driving shaft, gear teeth on said driving shaft and hollow lay shaft to be engaged upon movement of said driving shaft into a second position of adjustment, a first and second speed countershaft having a driven gear thereon, said gear teeth of said longitudinally movable driving shaft engaging said countershaft gear in an intermediate position of adjustment of said driving shaft and change speed gearing between said driven shaft and said countershaft.

2. Aligned driving and driven shafts and a parallel countershaft having a driven gear, power transmission means independent of the countershaft in constant driving relation with the driven shaft, a driven gear on said power transmission means, a pinion on said driving shaft, said driving shaft being movable longitudinally to a position wherein said pinion drives said power transmission means by engagement with said driven gear thereon, and to a position wherein said pinion engages the countershaft gear and drives the countershaft, and selective gearing between said countershaft and said power transmission means.

3. Aligned driving and driven shafts and a parallel countershaft having a driven gear, power transmission means in constant driving relation with the driven shaft, a pinion on the driving shaft, said driving shaft being movable longitudinally to a position wherein said pinion drives said power transmission means, and to a position wherein said pinion engages the countershaft gear and drives the countershaft, clutch teeth on said aligned shafts, said driving shaft being movable to another position of adjustment wherein said aligned shafts are in clutch engagement together with shiftable gearing between the countershaft and the power transmission means.

4. In a transmission device, a housing, a rotatable shaft therein, driving gear means to rotate said shaft, said driving gear means causing a longitudinal thrust, spaced bearings therefor carried by said housing, a fork in fixed longitudinal relation to said shaft carried by said housing and engaging said shaft between said bearings to receive longitudinal thrusts.

5. In a transmission device, a housing, aligned shafts, an eccentrically positioned shaft gearing between said eccentrically positioned shaft and each of said aligned shafts, through which one shaft is driven from the other, a fork carried by said housing and engaging said eccentric shaft to receive the longitudinal thrust of said gearing upon the eccentrically positioned shaft.

6. The invention defined by claim 5, together with means associated therewith to adjust said fork.

7. In a transmission device, a housing, a lay shaft therein, spaced bearings in said housing for said lay shaft, an annular recess on said lay shaft, a segmental fork in said recess, a tubular member carried by said casing, a radial stem on said fork receivable within said tubular member, means extended through said tubular member and engageable with said stem to adjust the fork.

8. The invention defined by claim 7 together with gear shifting lever rotatable on said stem.

9. The invention defined by claim 7 together with means associated with said tubular member and said stem to prevent relative rotation.

10. In a transmission, aligned driving and driven shafts, a gear ring eccentrically surrounding said shafts, constant meshed gears on said gear ring and said driven shaft, a parallel countershaft, means to move the driving shaft axially to a plurality of positions of adjustment, cooperating gearing including gear elements on the driving shaft and countershaft engageable in one of said positions of adjustment, cooperating gearing including gears on the driving shaft and eccentric ring in engagement in a second of said positions of adjustment, and positive clutch elements on said driving shaft and said driven shaft engageable with each other in a third of said positions of adjustment.

In testimony whereof we affix our signatures.

PERRY L. TENNEY.
HARRY E. FIDLER.